March 3, 1953    W. S. FREDENHAGEN ET AL    2,630,083
APPARATUS FOR DISPENSING ICE CREAM
Filed April 18, 1947                           3 Sheets-Sheet 1
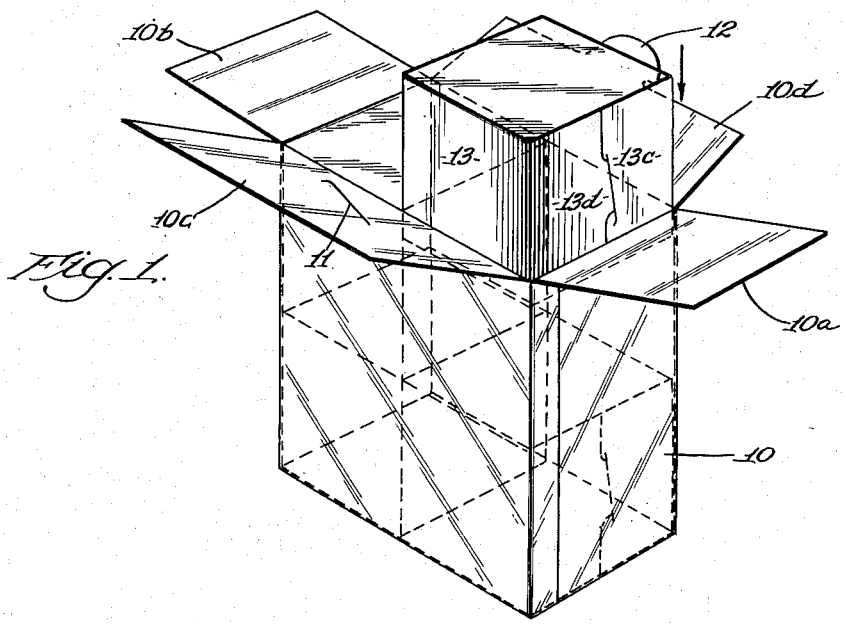
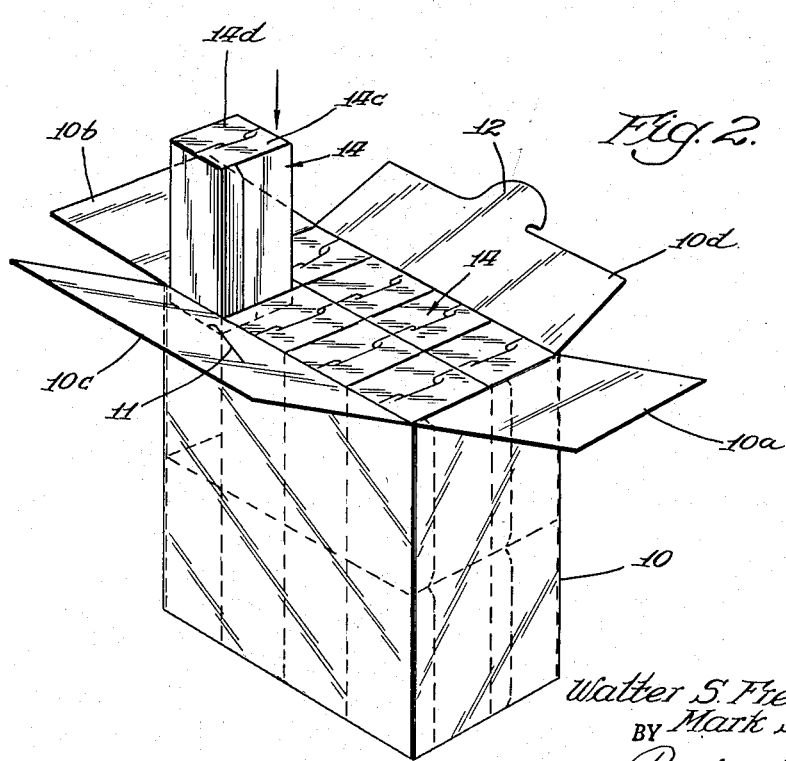
INVENTORS
Walter S. Fredenhagen
BY Mark S. Schmidt
Richard D. Mason
Atty.

March 3, 1953   W. S. FREDENHAGEN ET AL   2,630,083
APPARATUS FOR DISPENSING ICE CREAM
Filed April 18, 1947   3 Sheets-Sheet 2
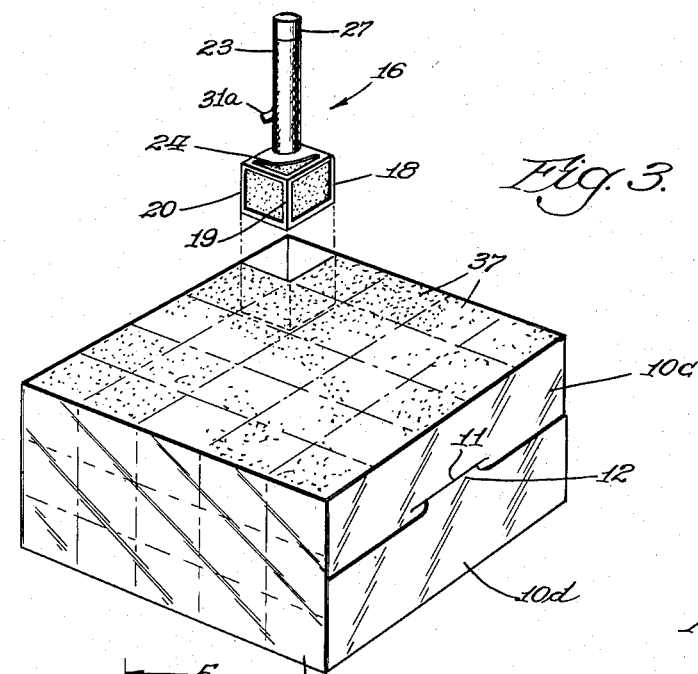
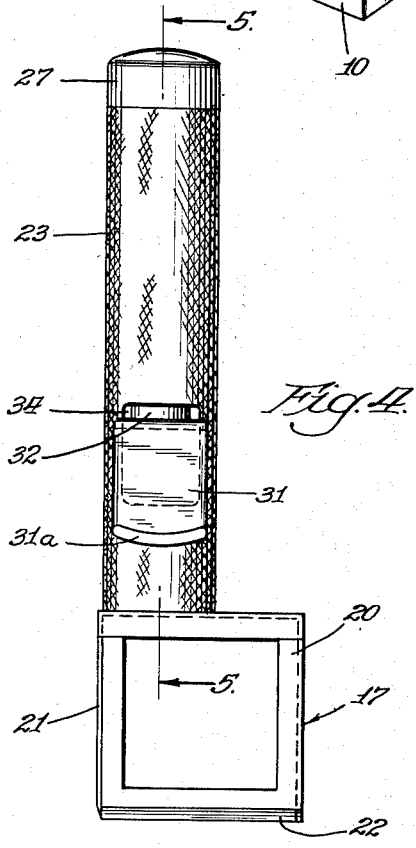
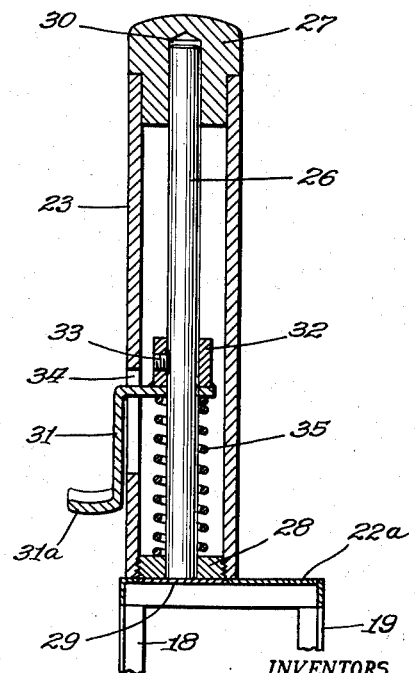
INVENTORS.
Walter S. Fredenhagen
Mark S. Schmidt
BY Richard D. Mason March 3, 1953　　W. S. FREDENHAGEN ET AL　　2,630,083
APPARATUS FOR DISPENSING ICE CREAM
Filed April 18, 1947　　　　　　　　　　　　3 Sheets-Sheet 3
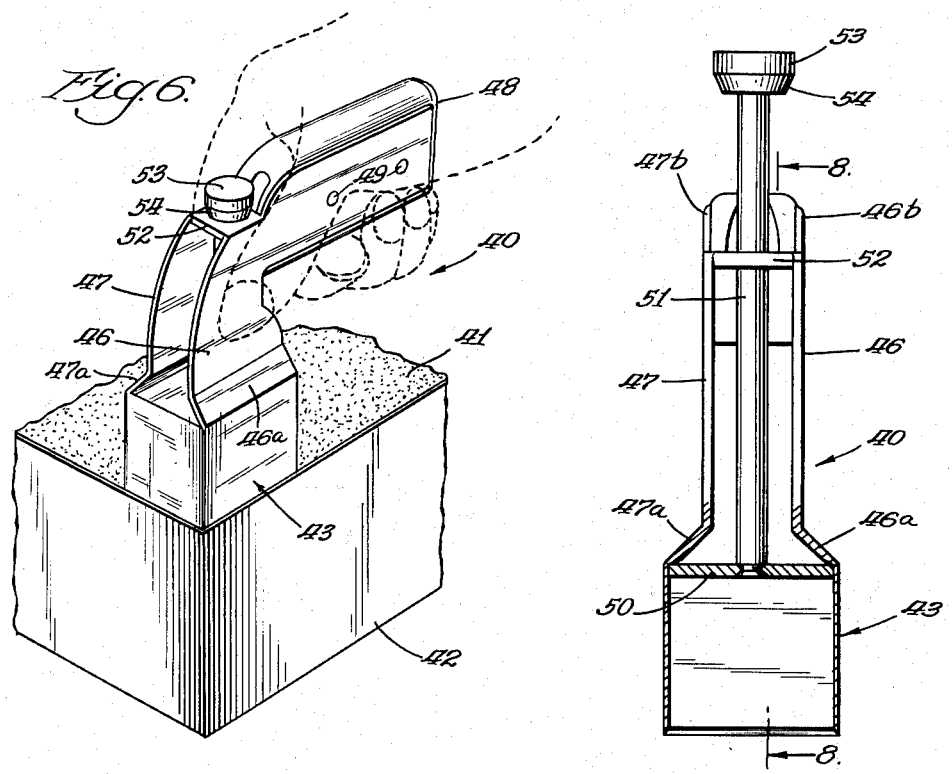
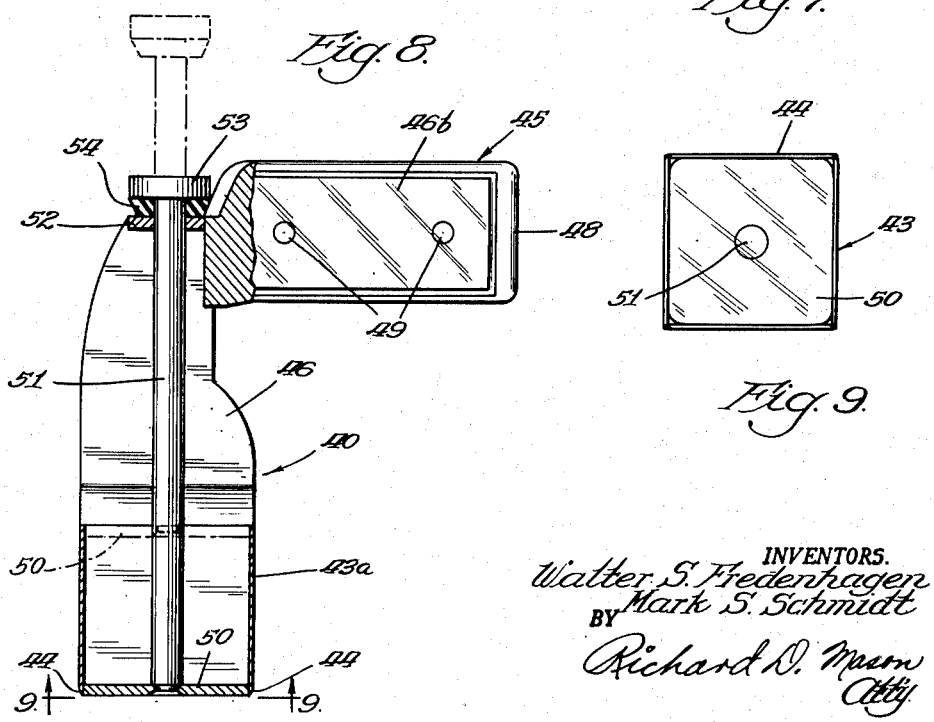
INVENTORS.
Walter S. Fredenhagen
Mark S. Schmidt
BY Richard D. Mason
Atty Patented Mar. 3, 1953

2,630,083

UNITED STATES PATENT OFFICE 2,630,083

APPARATUS FOR DISPENSING ICE CREAM

Walter S. Fredenhagen and Mark S. Schmidt, Naperville, Ill.

Application April 18, 1947, Serial No. 742,240

3 Claims. (Cl. 107—48)

The present invention relates to apparatus for dispensing ice cream which may be employed either at soda fountains, ice cream bars, or the like.

Heretofore it has been customary to package ice cream in containers of various shapes and sizes. There has been no specific relationship between containers of different sizes except as to the predetermined differences in the volume of ice cream containable therein. Various means for dispensing ice cream such as various types of dippers have also been employed. However, these dippers were generally of scoop form and although they bore a volumetric relationship to the containers from which ice cream was dispensed there was no lineal dimensional relationship to these containers. It would be desirable to provide an arrangement whereby a standard container or a series of standard containers of different sizes were employed whereby a dipper of a predetermined configuration having dimensions so related to the standardized ice cream containers could be used with the result that the operator dispensing the ice cream must dispense a predetermined number of dips per package, the measurement of the dip being determined by the length, width, and depth of the dipper. With this arrangement there is assurance of uniform dispensation of ice cream to each customer and in addition there is provided a means of maintaining a check upon the person dispensing the ice cream by virtue of the fact that the ice cream contained within a particular container will produce a predetermined number of dips known in advance.

It is an object of the present invention to provide new and improved apparatus for dispensing ice cream.

It is a further object of the present invention to provide a rectangular standard container for ice cream, together with a rectangular dipper for removing the ice cream from the container in units of uniform size, with the lineal dimensions of the dipper being so related to the length, width and thickness of the standardized ice cream container that the operator dispensing the ice cream will dispense a predetermined number of dips per package.

Still another object of the present invention is to provide standardized ice cream packaging units from a two-gallon size down to a pint size, in which a predetermined number of smaller size containers will accurately fit within the larger size containers to facilitate the problem of package handling in transporting packaged and bulk ice cream from the packaging point to the retail outlets, while at the same time permitting the use of a new and improved dipper for dispensing a predetermined integral number of dips from at least one of said standardized packaging units.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Fig. 1 is a perspective view illustrating a standard two-gallon container made in accordance with the present invention, showing how four one-half gallon containers of the construction made in accordance with the present invention can readily be accommodated therein;

Fig. 2 is a view similar to Fig. 1 showing the standardized two-gallon package or container of the present invention, showing how sixteen pint containers also constructed in accordance with the present invention are disposed therein;

Fig. 3 is a perspective view of a two-gallon container of the present invention together with the dipper for dispensing the same showing the dimensional relationship between the dipper and the container so as to provide a predetermined integral number of dips of ice cream;

Fig. 4 is an enlarged view of the dipper shown in Fig. 3;

Fig. 5 is a sectional view taken on line 5—5 of Fig. 4;

Fig. 6 is a perspective view of a modified dipper for dipping ice cream in accordance with the present invention with the plunger shown in one extreme position;

Fig. 7 is an elevational view partly in section of the dipper shown in Fig. 6 with the plunger moved to the other extreme portion from that shown in Fig. 6;

Fig. 8 is a sectional view taken on line 8—8 of Fig. 7, assuming Fig. 7 shows a complete device, with the plunger, however, moved to the position of Fig. 6; and Fig. 9 is a view looking in the direction of the arrows 9—9 of Fig. 8.

Referring now to the drawings there is illustrated what may be referred to as the standard two-gallon container designated at 10 in Figs. 1, 2 and 3 of the drawings. This so-called standard two-gallon container is rectangular in configuration with the length, width and thickness of the container having the general relationship shown in the drawings. At least one end of each container is provided with flaps 10a, 10b, 10c and 10d, which may be moved to overlapping relationship as shown in Fig. 3 of the drawings to form a closed container. The flap 10c is provided with a slit 11 for accommodating the latch or hooked portion 12 on the flap 10d, which is adapted to be inserted in the slit 11 thereby maintaining the two-gallon container 10 in the closed condition. Also in accordance with the present invention there are provided one-half gallon containers 13 of rectangular configuration similar to the container 10 and dimensioned so that four one-half gallon containers exactly fit within one two-gallon container 10 as shown in Fig. 1 of the drawings. These one-half gallon containers are provided with end flaps similar to the end flaps of the container 10, two of them, namely, 13c and 13d being visible in Fig. 1 of the drawings.

To further complete the standard package line for packaging and dispensing ice cream, there is illustrated in Fig. 2 of the drawings the same standard two-gallon container 10 with sixteen pint containers 14 disposed therein and of such configuration as to exactly fit within the two-gallon container 10. These containers are substantially identical except for size with the two-gallon container being provided with end closure flaps two of which, namely, 14d and 14c are visible in Fig. 2 of the drawings. With this arrangement it is apparent that the pint containers and half gallon containers can be packaged in the factory and disposed within the standard two-gallon container which is the largest size container employed. The standard two-gallon container furthermore is of such a size and configuration as to fit within the openings provided in frozen food containers of present construction now in extensive use in all ice cream dispensing establishments.

By employing containers of standardized dimensions such as the two-gallon container, the half gallon containers and the pint containers referred to above, the problem of handling and transporting packaged and bulk ice cream from the packing point to retail outlets is greatly facilitated. With these three sizes of containers and various combinations thereof any order for ice cream from one pint up can readily be filled.

In accordance with an important feature of the present invention, the two-gallon container 10 is used as the basic container from which ice cream is dispensed in bulk. This two-gallon container has predetermined dimensions which are directly related to the dimensions of an ice cream dipper generally indicated at 16 in Figs. 3 to 5 of the drawings.

In order better to understand the construction of the dipper 16 which also forms a part of the present invention, reference may be had to Figs. 4 and 5 of the drawings where an enlarged view thereof is illustrated. Essentially the dipper 16 comprises a rectangular scoop or dipper portion generally designated at 17 which comprises skeleton-like side members 18, 19, 20 and 21. The bottom of each of the side members 18 to 21, inclusive, is provided with a knife-like edge designated at 22 in Fig. 4 of the drawings with reference to side piece 20. The purpose of the knife-like edges at the bottom of all four side members arranged in a rectangular manner is to provide ready means for cutting into the ice cream within the container from which it is to be removed by the dipper 16.

The four side members 18, 19, 20 and 21 are held in rectangular relationship by means of a rectangular top tray member 22a to which the handle 23 of the dipper 16 is attached. Preferably, as is best shown in Fig. 3 of the drawings, the handle 23 is attached to one corner of the top member 22a and the side members 18, 19, 20 and 21 are suitably fastened thereto in a manner which will be apparent to those skilled in the art. In order to prevent the ice cream contained in the dipper 16 from sticking to the top member 22a a large opening 24 is preferably provided therein which opening furthermore enables the person dispensing the ice cream to see whether the dipper is fully inserted within the ice cream being dispensed.

In order readily to release the ice cream scooped into the dipper 16 as by pressing the dipper 16 downwardly into the bulk ice cream, the handle 23 is preferably hollow and has supported therein a suitable longitudinally movable pin 26 supported by an upper closure member 27 and a lower plug 28 threadedly mounted within the lower end of the handle 23. The handle 23 is preferably provided with an external surface which is knurled to form a suitable handle. The pin 26 is actually a plunger to the lower end of which is fastened a piston-like member 29. The upper end of the plunger 26 is reciprocal within an opening 30 in the top member 27 which opening is of substantial length so that the rod 26 is always guided by the member 27 regardless of the position it assumes during its reciprocating movement.

For the purpose of actuating the piston 29 and consequently the reciprocating rod 26, there is provided a Z-shaped lever 31 having one end thereof attached to the rod 26 as by means of a sleeve 32 suitably welded or the like to the Z-shaped member 31, and fastened to the rod 26 as by means of a set screw 33. The Z-shaped member 31 protrudes through an elongated slot or opening 34 in the handle 23, which handle as was mentioned above is hollow. Consequently, the end 31a of the Z-shaped member 31 extends outside of the handle and is readily actuated by a suitable finger such, for example, as the thumb of the operator for moving the piston 29 downwardly to eject the ice cream within the rectangular box member 17 of the dipper or the scoop 16. It will be understood that such downward movement of the piston 29 from the position shown in Fig. 5 of the drawings will cause the ejection of the ice cream contained within the scoop portion 17 of the dipper 16. In order that the piston or ejecting member 29 is normally maintained in its upward position as shown in Fig. 5 of the drawings, there is provided a suitable compression spring 35 coaxially arranged relative to the rod 26 and disposed between the plug 28 threaded in the lower end of the handle 23 and the end of the Z-shaped member 31 fastened to the rod 26.

An important feature of the present invention is the dimensional relationship between the rectangular scoop or container portion 17 of the dipper 16 and the dimensions of the two-gallon container 10 described above. As is illustrated in Fig. 3 of the drawings, the contents of the two-gallon container 10 are marked off in rectangular solids 37, each having a cubicle content equal exactly to the cubicle content of the scoop portion 17 of the dipper 16. Furthermore, the rectangular solids 37 are of such a shape as to exactly fit within the scoop portion 17 of the dipper 16. It will be noted that the volume of the two-gallon container 19 is divided into an integral number of the rectangular solids 37, or in other words, the container 19 will hold an integral number of scoops or dips of the dipper 16 as illustrated in the drawings. As illustrated in the drawings, the scoop 17 of the dipper 16 substantially forms a cube. It should be understood, however, that this particular configuration is not necessary and the dipper 18 may be used to dispense a rectangular solid of ice cream of any configuration.

With the present invention, however, the lineal dimensions of the dipper are so related to the length, width and thickness of the standardized two-gallon ice cream container that a predetermined number of dips per package can be obtained. The measurement of the dips being determined by the length, width and depth of the dipper. It is apparent that with this arrangement a uniform amount of ice cream will be dispensed to each customer and in addition, a vehicle is provided whereby a check may be obtained upon the clerks who are dispensing the ice cream. In other words, each package should contain a predetermined number of dips and it is readily possible to check and determine whether this number of dips were sold from the two-gallon container.

Although the invention has been described as employing a particular kind of dipper shown in detail in Figs. 3, 4 and 5 of the drawings, there is illustrated in Figs. 6 to 9 of the drawings a modified dipper illustrating a preferred embodiment thereof. This dipper generally designated at 40 is shown at the instant of insertion into a quantity of ice cream 41 disposed in a rectangular container 42 which bears pre-determined dimensional relationships to the rectangular scoop portion 43 of the dipper 40.

The dipper 40 is of very simple and compact construction so that it may be manufactured at low cost and with a minimum of assembly operations. As illustrated, the scoop portion 43 of the dipper 40 is formed of walls such as 43a of relatively thin sheet metal such, for example, as stainless steel or the like. This scoop portion 43 may be formed by a metal stamping operation in a manner well understood by those skilled in the art. The lower edges of the scoop 43 provide knife-like edges designated at 44 so as to facilitate insertion thereof into the bulk ice cream 41.

For the purpose of manipulating the scoop portion 43 as by inserting or removing it from the ice cream 41 there is provided a suitable handle 45 which is connected by L-shaped metal members 46 and 47 with the upper part of the scoop portion 43. The L-shaped members 46 and 47 are separated to a lesser extent than the width of the scoop portion 43 as is best shown in Fig. 7 and accordingly the lower portions 46a and 47a respectively of the L-shaped members 46 and 47 are flared to permit the joining thereof with the scoop portion 43 as by welding or in any other suitable manner. The portions 46b and 47b of the L-shaped metal portions 46 and 47 are illustrated as being disposed on either side of a suitable insulating member 48 so as to define a suitable pistol grip handle, the portions 46b and 47b being fastened to the member 48 as by suitable rivets or the like indicated at 49. It will be understood that the particular construction of the handle 45 is immaterial as far as the present invention is concerned and it may entirely comprise metal or any other suitable material. It is, however, desirable to have the piston grip arrangement which permits the operator, as is clearly evident from Fig. 6 of the drawings, to apply a direct and substantial force when inserting the scoop portion 43 into the ice cream such as 41 for example.

In accordance with the present invention there is provided a rectangular plunger member 50 formed of metal similar to that from which the scoop 43 is formed except that it is of substantially thicker material as is clearly indicated in the drawings. This plunger 50 is connected in any suitable manner to the lower end of a movable rod 51 mounted for guided reciprocal movement in a suitable opening defined in a cross piece 52 extending between the two L-shaped members 46 and 47 and preferably integrally joined thereto as by welding or the like. The end of the plunger 51 extending through the cross piece 52 is provided with a suitable manually engageable button 53 which is preferably manipulated by the thumb action of the operator in a manner which will become apparent from an examination of the drawings. To cushion the engagement of the button 53 with the cross piece 52 there is preferably provided a resilient gasket such as 54 which may be associated with either the underside of the button 53 or the upper side of the cross piece 52. As illustrated in the drawings, the gasket 54 is associated with the button 53.

The relative differences in thickness between the walls of the scoop portion 43 and the plunger 50 forms an important feature of the dipper 40. It is, of course, desirable that the ice cream dipped by the scoop 43 of the dipper 40 remain within the scoop portion until forcibly ejected by the downward movement of the button 53. By virtue of the fact that the walls 43 are formed of relatively thin material, the insertion of scoop portion 43 into the ice cream will cause these walls to almost immediately be cooled to a sufficient extent that the ice cream will cling thereto sufficiently until forcibly ejected therefrom by manipulation of the button 53.

On the other hand it is desired that no clinging action occurs as between the ice cream and the plunger or ejector member 50. Since this plunger 50 is made of a material having a substantial mass it will retain a sufficient amount of heat to cause a melting action of the ice cream immediately adjacent thereto whereupon when an ejecting action is initiated the ice cream will not stick to the plunger 50. Consequently, with the described arrangement ready release of the ice cream from the scoop portion 43 results without inadvertent release thereof.

It will be noted that the plunger disclosed in Figs. 6 to 9 inclusive, is very simple in construction. No spring or similar apparatus for retracting the plunger 50 is required since such retracting action to move from the solid line portion of Fig. 8 to the dotted line portion thereof automatically occurs upon forcing the scoop portion 43 into the ice cream 41 in the manner clearly indicated in Fig. 6 of the drawings. Furthermore, the dipper is so constructed that the operator may apply a minimum of force in inserting the dipper into the ice cream by pushing in a natural direction, thereby greatly reducing the fatigue of the operator in dipping the ice cream. This is furthermore facilitated by the pistol grip arrangement disclosed.

It will be apparent to those skilled in the art that the present invention is not limited to the particular construction shown and that changes and modifications may be made without departing from the spirit and scope of the present invention. It is aimed in the appended claims to cover all such changes and modifications.

What is claimed as new and desired to be secured by Letters Patent of the United States is:

1. A dipper for dispensing a food product comprising a rectangular scoop portion having two oppositely disposed open ends one of which is insertable into bulk ice cream, said scoop being formed of thin metallic material, an L-shaped handle comprising a pair of identical sheet metal L-shaped side portions and means associated with one corresponding leg of each of said L-shaped side portions for maintaining said side portions in spaced parallel relationship, the spacing between said side portions being less than the smallest dimension of said rectangular scoop portion, means for attaching the ends of said L-shaped side portions remote from said first mentioned means to the scoop portion of said dipper at said other open end so as to provide an effective pistol grip for said dipper to insure ready insertion into bulk ice cream by the application of a downward force to said handle causing said open end to move in a direction along the vertical axis of said scoop portion when said scoop portion is forced into a mass of bulk ice cream, a plunger movable in said scoop portion, said plunger being formed of thick metallic material as compared to the material forming the scoop portion, and means comprising a deformation of said L-shaped handle to limit movement in one direction of said plunger within said scoop portion.

2. A dipper for dispensing a frozen comestible comprising a rectangular scoop portion open at each end with one open end insertable into the frozen comestible, said scoop portion having the characteristic of assuming the temperature of the comestible to produce adherence between the walls of the scoop and the comestible encircled thereby, an L-shaped handle comprising a pair of identical sheet metal L-shaped side portions and means associated with one corresponding leg of each of said L-shaped side portions for maintaining said side portions in spaced parallel relationship, the spacing between said side portions being less than the smallest dimension of said rectangular scoop portion, means for attaching the ends of said L-shaped side portions remote from said first mentioned means to the scoop portion of said dipper at said other open end to provide an effective pistol grip for said dipper thereby insuring ready insertion into the comestible by the application of a force to said handle to cause said one open end to move in a direction along the axis of said scoop portion parallel with the walls defining the rectangular scoop portion, a plunger movable in said scoop portion and forming the only closure for said other open end, said plunger being heat retentive to prevent adherence between the plunger and the comestible, and means for actuating said plunger including a portion adjacent said pistol grip whereby actuation of the plunger to move it through the scoop expels the comestible from the scoop by mechanically removing the encircled comestible from adherence with the walls of the scoop.

3. The invention defined by claim 2 in which the scoop portion is formed of thin metallic walls to produce adherence of the comestible thereto and in which the plunger is formed of a large metallic mass relative to the mass of the walls to produce the heat retentive characteristic whereby the comestible does not adhere to the plunger.

WALTER S. FREDENHAGEN.
MARK S. SCHMIDT.

REFERENCES CITED

The following references are of record in the file of this patent:

UNITED STATES PATENTS

| Number | Name | Date |
|---|---|---|
| 335,390 | Silbermann et al. | Feb. 2, 1886 |
| 797,379 | Silden | Aug. 15, 1905 |
| 827,622 | Ericson | July 31, 1906 |
| 830,728 | Longstreth | Sept. 11, 1906 |
| 870,496 | Curtin | Nov. 5, 1907 |
| 1,352,755 | Levy | Sept. 14, 1920 |
| 1,438,315 | Knowlton | Dec. 12, 1922 |
| 1,539,678 | Labombarde | May 26, 1925 |
| 1,546,074 | Holland | July 14, 1925 |
| 1,583,072 | Landman | May 4, 1926 |
| 1,721,045 | Martineau | July 16, 1929 |
| 1,896,083 | Harris | Feb. 7, 1933 |
| 1,909,126 | Satterthwaite | May 16, 1933 |
| 2,037,723 | Heineman | Apr. 21, 1936 |
| 2,109,102 | Cocks | Feb. 22, 1938 |
| 2,176,752 | Taggart | Oct. 17, 1939 |
| 2,380,367 | Ranney | July 10, 1945 |

FOREIGN PATENTS

| Number | Country | Date |
|---|---|---|
| 4,093 | Great Britain | Mar. 15, 1915 |